United States Patent
Bawa et al.

(10) Patent No.: US 10,417,396 B2
(45) Date of Patent: Sep. 17, 2019

(54) SYSTEM AND METHODS FOR PROVISIONING AND MONITORING LICENSING OF APPLICATIONS OR EXTENSIONS TO APPLICATIONS ON A MULTI-TENANT PLATFORM

(71) Applicant: NETSUITE INC., San Mateo, CA (US)

(72) Inventors: Gaurav Bawa, San Mateo, CA (US); Matheus Carvalho, San Mateo, CA (US)

(73) Assignee: NETSUITE INC., San Mateo, CA (US)

( * ) Notice: Subject to any disclaimer, the term of this patent is extended or adjusted under 35 U.S.C. 154(b) by 152 days.

(21) Appl. No.: 15/486,006

(22) Filed: Apr. 12, 2017

(65) Prior Publication Data

US 2017/0300668 A1    Oct. 19, 2017

Related U.S. Application Data

(60) Provisional application No. 62/322,606, filed on Apr. 14, 2016.

(51) Int. Cl.
  *G06F 21/10* (2013.01)
  *G06Q 30/00* (2012.01)
  *G06F 21/62* (2013.01)

(52) U.S. Cl.
  CPC .......... *G06F 21/105* (2013.01); *G06F 21/629* (2013.01); *G06Q 30/012* (2013.01); *G06F 2221/0773* (2013.01)

(58) Field of Classification Search
  CPC ................ G06F 21/105; G06F 21/629; G06F 2221/0773; G06Q 30/012
  See application file for complete search history.

(56) References Cited

U.S. PATENT DOCUMENTS

| | | | |
|---|---|---|---|
| 9,075,687 B1 | 7/2015 | Liu et al. | |
| 9,509,571 B1 | 11/2016 | Liu | |
| 9,733,921 B1 | 8/2017 | Saenz et al. | |
| 9,817,991 B2 | 11/2017 | Boncha et al. | |
| 9,892,467 B2 | 2/2018 | Shak et al. | |
| 2010/0071069 A1* | 3/2010 | Sugiura | G06F 21/105 726/26 |
| 2010/0185862 A1* | 7/2010 | Moore | H04L 9/08 713/171 |
| 2013/0132530 A1* | 5/2013 | Asahara | H04N 1/00344 709/220 |

(Continued)

*Primary Examiner* — Meng Li
(74) *Attorney, Agent, or Firm* — Kraguljac Law Group, LLC

(57) ABSTRACT

Embodiments of the invention provide a mechanism for a multi-tenant platform operator (or a developer or publisher of an application or an extension to an existing platform application) to control the access and functionality available within the application or extension on an account specific basis, based on the subscription license terms applicable to each account/customer. Embodiments of the invention enable a more practical and efficient management of access controls and functionality for a relatively large customer base, where certain accounts, customers, or users may be entitled to a different or at least partially different set of rights and functionality.

20 Claims, 6 Drawing Sheets

(56) References Cited

U.S. PATENT DOCUMENTS

| | | | |
|---|---|---|---|
| 2014/0109237 A1* | 4/2014 | Novick | G06F 21/10 |
| | | | 726/27 |
| 2014/0330936 A1* | 11/2014 | Factor | H04L 63/0281 |
| | | | 709/219 |
| 2016/0104003 A1* | 4/2016 | Schneider | G06F 21/6218 |
| | | | 726/1 |
| 2016/0188700 A1* | 6/2016 | Kleinschnitz, Jr. | |
| | | | G06F 17/30598 |
| | | | 707/692 |

* cited by examiner

SYSTEM AND METHODS FOR PROVISIONING AND MONITORING LICENSING OF APPLICATIONS OR EXTENSIONS TO APPLICATIONS ON A MULTI-TENANT PLATFORM

CROSS REFERENCE TO RELATED APPLICATION

This application claims the benefit of U.S. Provisional Application No. 62/322,606, entitled "System and Methods for Provisioning and Monitoring Licensing of Applications or Extensions to Applications on a Multi-Tenant Platform," filed Apr. 14, 2016, which is incorporated by reference herein in its entirety (including the Appendix) for all purposes.

BACKGROUND

A multi-tenant architecture provides a means for multiple accounts and users to access their data and specific applications that reside on a remote platform that is typically administered by another party. The applications may be used to process certain of a user's data by instantiating an occurrence of the application within the user's account. Although this provides each user or account with a group of applications that may be utilized to operate a business (such as ERP, CRM, eCommerce, and financial applications), in some cases, a tenant may desire to modify or supplement the functionality of an existing platform application by introducing a new application or an extension to an application, where the new application or extension is to be made available to the tenant's employees and/or customers. Note that although portions of the following description refer to an extension to an existing application as a general case, much (if not all) of the description apply to a new application or functional component as well.

In some cases an extension or enhancement may be applied to the processing of the tenant's business related data that is resident on the platform. The extension may be developed by the tenant or by a $3^{rd}$ party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to select and configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to an application that is available to users through a multi-tenant data processing platform. The extension may add new functionality or capabilities to the underlying application. One or more tenants/users of the platform may wish to add the extension to the underlying application to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) to obtain feedback for improving the newer version of the extension, to test the stability of the extension, or to assist them to segment the market for their extension(s).

In addition to handling upgrades or patches to software code, there is a general need for administrative and management capabilities that enable one or more of a platform administrator, tenant, or the developer of an extension to monitor and control the use of an extension. This task is made more complex and difficult to implement because of the multiplicity of tenants and users, and of the types and number of extensions that may be available. For example, each account (and perhaps even each user within the same account) may have a set of "rights" to use certain aspects of an extension (or a new application, application component, etc.). These rights may change over time, based (for example) on the satisfaction of certain criteria or thresholds, based on the role or function of a user, in response to specific business conditions or events, etc.

However, conventional approaches to the management of such extensions are typically limited and manually intensive, if such capabilities even exist. For example, most applications apply a passive merit based control of use rights, where tenants and users are expected to proactively stop using the solution once their right is revoked. Other extensions utilize a manual periodic access rights review to block the usage by tenants or users whose rights have expired. This results in a lack of an effective and efficient mechanism for managing the set of licensable rights that are applicable to an extension, new application, or application component.

Embodiments of the inventive system and methods are directed to overcoming the limitations associated with conventional approaches to managing the licensing and rights conveyed by a license for use of one or more extensions to the functionality of a multi-tenant platform, both individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention provide a mechanism for a multi-tenant platform operator (or a developer or publisher of an application or an extension to an existing platform application) to control the access and functionality available within the application or extension on an account specific basis, based on the subscription license terms applicable to each account/customer. Embodiments of the invention enable a more practical and efficient management of access controls and functionality for a relatively large customer base, where certain accounts, customers, or users may be entitled to a different or at least partially different set of rights and functionality.

In one embodiment, the invention is directed to a system for managing the usage of an application or an extension to an application, where the system includes:
one or more applications installed on a data processing platform;
one or more extensions to at least one of the one or more applications, each of the one or more extensions installed on the data processing platform and each extension associated with a corresponding set of license terms governing the use of the extension;
a plurality of tenant accounts, wherein each tenant account is configured to have access to an instantiation of at least one of the one or more applications installed on the data processing platform;
an electronic processing element programmed with a set of computer-executable instructions, the programmed processing element operating to cause the system to
receive a request from a user of one of the plurality of tenant accounts to access an application or an extension to an application;
determine if a license cache associated with the one of the plurality of tenant accounts contains an active license for the account with respect to the application or with respect to the extension;
if the license cache does contain an active license for the one of the plurality of tenant accounts with respect to the application or with respect to the extension, then access data that provides information regarding the rights of the account with respect to the application or to the extension;
based on the accessed data, determine the terms or conditions of the license for the one of the plurality of tenant accounts with respect to the application or to the extension;
based on the determined terms or conditions, configure the application or extension for the one of the plurality of tenant accounts; and
make the configured application or extension available for use by the user of the one of the plurality of tenant accounts.

In another embodiment, the invention is directed to a data processing platform, where the platform includes:
an application installed on the data processing plat or
an extension to the application, the extension installed on the data processing platform and associated with a set of license terms governing the use of the extension;
a plurality of tenant accounts, wherein each tenant account is configured to have access to an instantiation of the application installed on the data processing platform;
an electronic processing element programmed with a set of computer-executable instructions; the programmed processing element operating to cause the platform to
receive a request from a user of one of the plurality of tenant accounts to access the extension to the application;
in response to the request, determine if a license cache associated with the one of the plurality of tenant accounts contains an active license for the account with respect to the extension;
if the license cache does contain an active license for the one of the plurality of tenant accounts with respect to the extension, then access data that provides information regarding the rights of the account with respect to the extension;
based on the accessed data, determine the terms or conditions of the license for the one of the plurality of tenant accounts with respect to the extension;
based on the determined terms or conditions, configure the extension for the one of the plurality of tenant accounts; and
make the configured extension available for use by the user of the one of the plurality of tenant accounts.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

Figure 1:
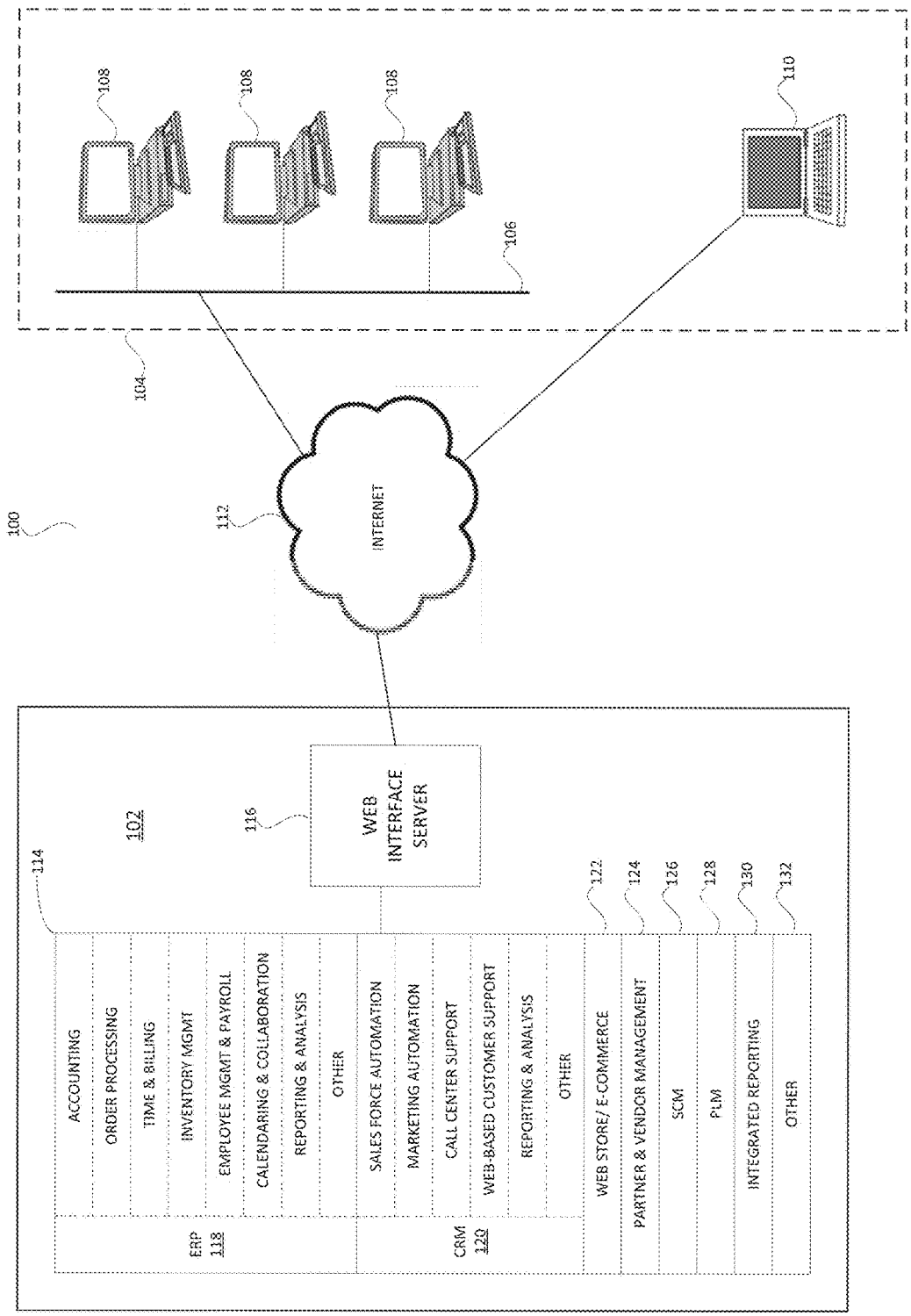
FIG. 1 is a diagram illustrating a system, including an integrated business system and an enterprise network in which an embodiment of the invention may be implemented.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that is part of a client device, server, network element, or other form of computing or data processing device/platform and that is programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Embodiments of the inventive system and methods relate to effectively and efficiently managing the rights associated with a license to an application or to an extension to an application that is installed on a multi-tenant data processing platform. In some embodiments, a client-server architecture is used in which a client side application communicates with a server side application in order to identify, provide access to, and monitor the usage of an application or extension in accordance with the terms of a licensing agreement.

As noted, in some embodiments, the invention may be implemented in the context of a multi-tenant, "cloud" based environment (such as a multi-tenant business data processing platform), typically used to develop and provide Internet/web-based services and business applications for end users. This exemplary implementation environment will be described with reference to FIGS. 1-3. Note that embodiments of the invention may also be implemented in the context of other computing or operational environments or systems, such as for an individual business data processing system, a private network used with a plurality of client terminals, a remote or on-site data processing system, another form of client-server architecture, etc.

Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low-level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high-level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. With differing levels of overlap with ERP/CRM initiatives and with each other, efforts have also been directed toward development of increasingly integrated partner and vendor management systems, as well as web store/eCommerce, product lifecycle management (PLM), and supply chain management (SCM) functionality.

FIG. 1 is a diagram illustrating a system 100, including an integrated business system 102 and an enterprise network 104 in which an embodiment of the invention may be implemented. Enterprise network 104 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 104 is represented by an on-site local area network 106 to which a plurality of personal computers 108 are connected, each generally dedicated to a particular end user (although such dedication is not required), along with an exemplary remote user computer 110 that can be, for example, a laptop computer or tablet computer of a traveling employee having internet access through a hotel, coffee shop, a public Wi-Fi access point, or other internet access method. The end users associated with computers 108 and 110 may also (or instead) possess an internet-enabled smartphone or other electronic device (such as a PDA) having wireless internet access or other synchronization capabilities. Users of the enterprise network 104 interface with the integrated business system 102 across the Internet 112 or another suitable communications network or combination of networks.

Integrated business system 102, which may be hosted by a dedicated third party, may include an integrated business server 114 and a web interface server 116, coupled as shown in FIG. 1. It is to be appreciated that either or both of the integrated business server 114 and the web interface server 116 may be implemented on one or more different hardware systems and components, even though represented as singular units in FIG. 1. In one embodiment, integrated business server 114 comprises an ERP module 118 and further comprises a CRM module 120. In many cases, it will be desirable for the ERP module 118 to share methods, libraries, databases, subroutines, variables, etc., with CRM module 120, and indeed ERP module 118 may be intertwined with CRM module 120 into an integrated Business Data Processing Platform (which may be single tenant, but is typically multi-tenant).

The ERP module 118 may include, but is not limited to, a finance and accounting module, an order processing module, a time and billing module, an inventory management and distribution module, an employee management and payroll module, a calendaring and collaboration module, a reporting and analysis module, and other ERP-related modules. The CRM module 120 may include, but is not limited to, a sales force automation (SFA) module, a marketing automation module, a contact list module (not shown), a call center support module, a web-based customer support module, a reporting and analysis module, and other CRM-related modules. The integrated business server 114 (or multi-tenant data processing platform) further may provide other business functionalities including a web store/eCommerce module 122, a partner and vendor management module 124, and an integrated reporting module 130. An SCM (supply chain management) module 126 and PLM (product lifecycle management) module 128 may also be provided. Web interface server 116 is configured and adapted to interface with the integrated business server 114 to provide one or more web-based user interfaces to end users of the enterprise network 104.

The integrated business system shown in FIG. 1 may be hosted on a distributed computing system made up of at least one, but likely multiple, "servers." A server is a computer/platform dedicated to hosting or providing an execution environment for one or more software applications or services, where the applications or services are intended to serve the needs of the users of other computers that are in data communication with the server (for instance via a public network such as the Internet or a private "intranet" network). The server, and the services it provides, may be referred to as the "host" and the remote computers (and the software applications running on the remote computers) being served may be referred to as "clients." Depending on the computing service that a server offers it could be referred to as a database server, file server, mail server, print server, web server, etc. For example, a web server is most often a combination of hardware and the software that helps deliver content, commonly by hosting a website, to client web browsers that access the web server via the Internet.

Figure 2:
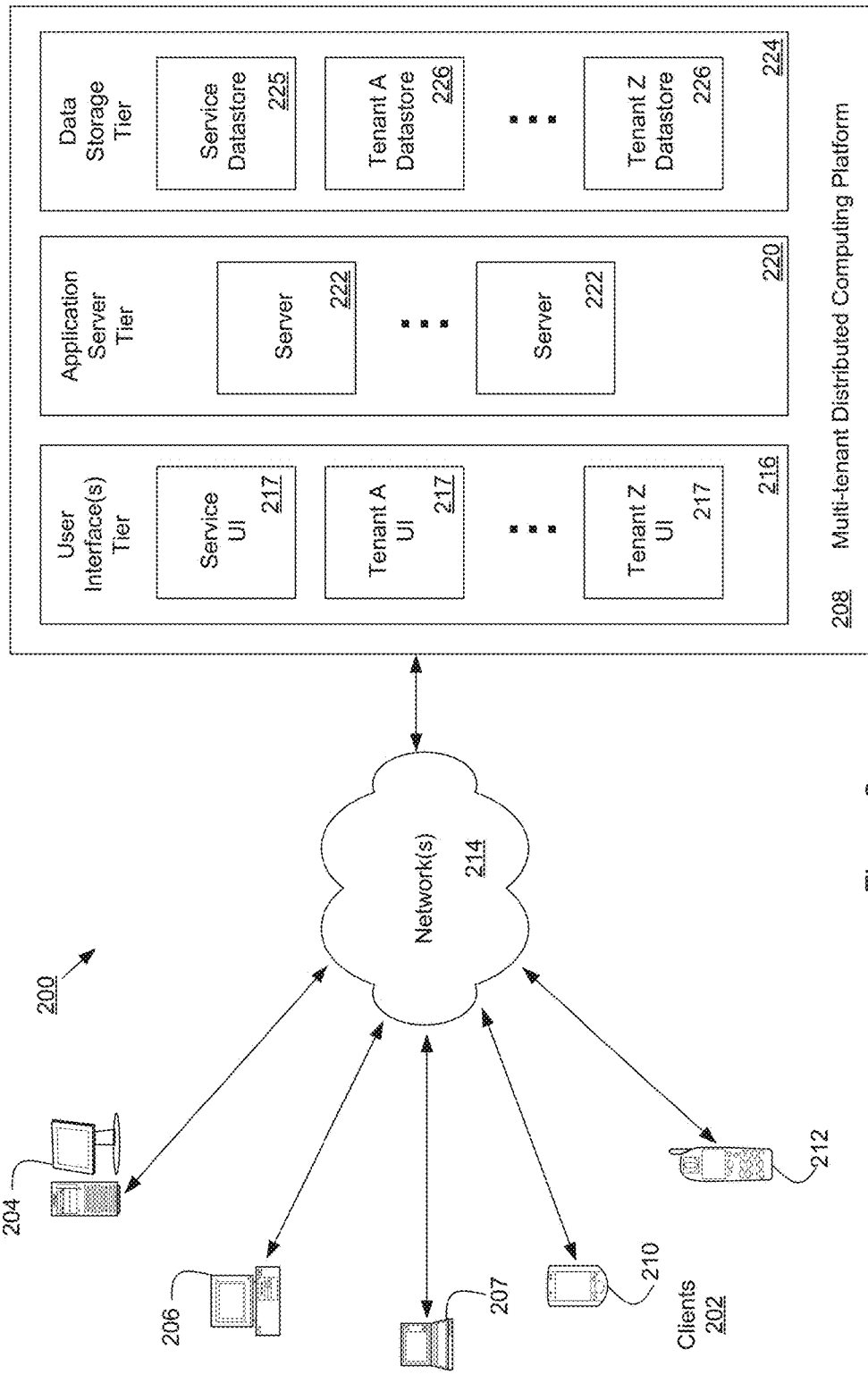
FIG. 2 is a diagram illustrating elements or components of an example operating environment in which an embodiment of the invention may be implemented.

FIG. 2 is a diagram illustrating elements or components of an example operating environment 200 in which an embodiment of the invention may be implemented. As shown, a variety of clients 202 incorporating and/or incorporated into a variety of computing devices may communicate with a distributed computing service/platform 208 through one or more networks 214. For example, a client may incorporate and/or be incorporated into a client application (e.g., software) implemented at least in part by one or more of the computing devices. Examples of suitable computing devices include personal computers, server computers 204, desktop computers 206, laptop computers 207, notebook computers, tablet computers or personal digital assistants (PDAs) 210, smart phones 212, cell phones, and consumer electronic devices incorporating one or more computing device components, such as one or more electronic processors, microprocessors, central processing units (CPU), or controllers. Examples of suitable networks 214 include networks utilizing wired and/or wireless communication technologies and networks operating in accordance with any suitable networking and/or communication protocol (e.g., the Internet).

The distributed computing service/platform (which may also be referred to as a multi-tenant business data processing platform) 208 may include multiple processing tiers, including a user interface tier 216, an application server tier 220, and a data storage tier 224. The user interface tier 216 may maintain multiple user interfaces 217, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 224 may include one or more data stores, which may include a Service Data store 225 and one or more Tenant Data stores 226.

Each tenant data store 226 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 208 may be multi-tenant and service platform 208 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 222 that are part of the platform's Application Server Tier 220.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform (such as element 208 of FIG. 2) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 222 that are part of the platform's Application Server Tier 220.

Note that both functional advantages and strategic advantages may be gained by using an integrated business system comprising ERP, CRM, and other business capabilities, as for example where the integrated business system is integrated with a merchant's eCommerce platform and/or "webstore." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 208 of FIG. 2).

As noted with regards to FIG. 1, the integrated business system shown in FIG. 2 may be hosted on a distributed computing system made up of at least one, but typically multiple, "servers." A server is a computer/platform dedicated to hosting or providing an execution environment for one or more software applications or services, where the applications or services are intended to serve the needs of the users of other computers that are in data communication with the server (for instance via a public network such as the Internet or a private "intranet" network). The server, and the services it provides, may be referred to as the "host" and the remote computers (and the software applications running on the remote computers) being served may be referred to as "clients."

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

As mentioned, in some cases, a tenant may desire to modify or supplement the functionality of an existing platform application by using an extension to that application, where the extension is to be made available to the tenant's employees and/or customers. In some cases, such an extension may be applied to the processing of the tenant's business related data that is resident on the platform. The extension may be developed by the tenant or by a $3^{rd}$ party developer and then made available to the tenant for installation. Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. As noted, in addition to user customizations, an independent software developer may create an extension to an application that is available to users through a multi-tenant data processing platform. The extension may add new functionality or capabilities to the underlying application. One or more tenants/users of the platform may wish to add the extension to the underlying application to be able to utilize the enhancements to the application that are made possible by the extension.

In some cases, the developer or platform operator may wish to control the ability of an account, a tenant, or specific users to access and utilize an extension or a new application or functionality. This may be implemented in the form of a license or similar control structure for the extension, where the "rights" under the license may be a function of a user, a tenant, an account, a role, a specific task being performed, a state or condition of the account, or other relevant characteristic. For example, the "rights" permitted to a specific user or account may depend upon the type of license made available to the user or account, where the type of license may be wholly or partially dependent upon the user or account's volume of transactions, business status (as reflected by ERP, CRM, or other type of data), etc.

Figure 3:
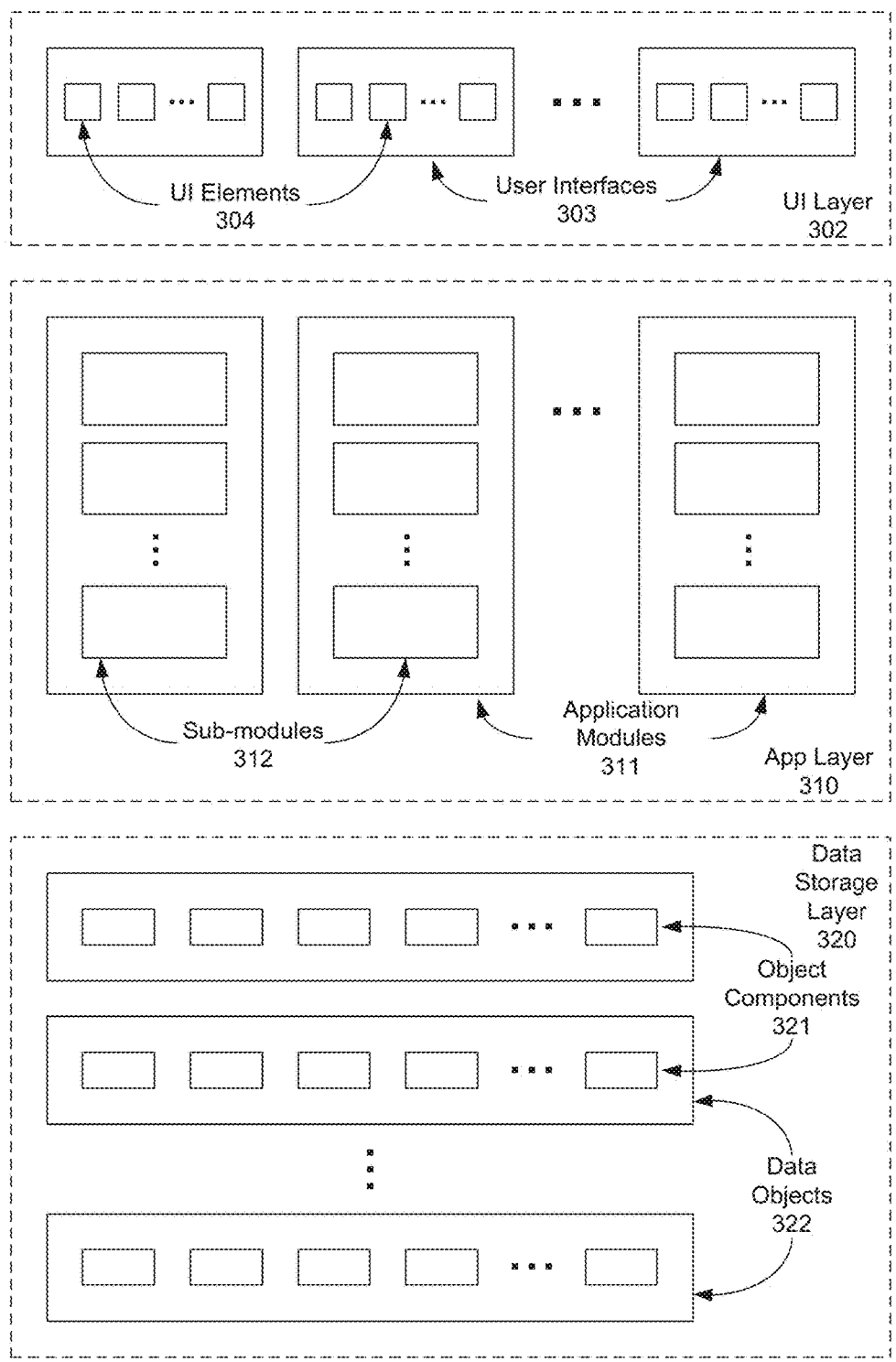
FIG. 3 is a diagram illustrating additional details of the elements or components of the multi-tenant distributed computing service platform of FIG. 2, in which an embodiment of the invention may be implemented.

FIG. 3 is a diagram illustrating additional details of the elements or components of the multi-tenant distributed computing service platform of FIG. 2, in which an embodiment of the invention may be implemented. The software architecture depicted in FIG. 2 represents an example of a complex software system to which an embodiment of the invention may be applied. In general, an embodiment of the invention may be implemented using a set of software instructions that are designed to be executed by a suitably programmed processing element (such as a CPU, microprocessor, processor, controller, computing device, etc.). In a complex system, such instructions are typically arranged into "modules" with each such module performing a specific task, process, function, or operation. The entire set of modules may be controlled or coordinated in their operation by an operating system (OS) or other form of organizational platform.

As noted, FIG. 3 is a diagram illustrating additional details of the elements or components 300 of the multi-tenant distributed computing service platform of FIG. 2, in which an embodiment of the invention may be implemented. The example architecture includes a user interface layer or tier 302 having one or more user interfaces 303. Examples of such user interfaces include graphical user interfaces and application programming interfaces (APIs). Each user interface may include one or more interface elements 304. For example, users may interact with interface elements to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

The application layer 310 may include one or more application modules 311, each having one or more sub-modules 312. Each application module 311 or sub-module 312 may correspond to a function, method, process, or operation that is implemented by the module or sub-module (e.g., a function or process related to providing ERP, CRM, HR (HCM), eCommerce or other functionality to a user of the platform). Such function, method, process, or operation may also include those used to implement one or more aspects of the inventive system and methods, such as for:

implementing a process to authenticate a user or account to permit access to one or more capabilities or functions of a desired extension or application;
    where if applicable, the process may permit a user or account to establish a new account (such as by registration of a purchase of rights to use the extension or application) for the purpose of being able to access the extension or application;
  implementing a process to determine which of a set of possible rights to an extension or application can be accessed by the user or account;
    including implementing a process to configure another process to detect if a user or account is seeking access to an extension or application, and in response to access data regarding a specific license of rights to use the extension or application;
  implementing a process to determine if a license cache contains an active or valid license for the user or account with respect to the extension or application;
  implementing a process to enable the user or account to access a set of rights in the use of the extension or application, based at least in part on the terms of a relevant license;
    where this may include configuring the extension or application so that certain features, functions, or capabilities are either accessible by the user or account, or are not accessible by the user or account;
  implementing a user communication system, to provide information regarding a user's access rights and application restrictions to the end user;
  implementing a secure communication layer between a tenant account and the license server, ensuring that licenses made available for one tenant cannot be used by others; and
  implementing a user dashboard that provides end-user visibility into the available extensions, and in some cases into the functionality and license terms of an extension or extensions.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 222 of FIG. 2) may include each application module. Alternatively, different application servers may include different sets of application modules. Such sets may be disjoint or overlapping.

The data storage layer 320 may include one or more data objects 322 each having one or more data object components 321, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 1-3 are not intended to be limiting examples. Alternatively, or in addition, computing environments in which an embodiment of the invention may be implemented include any suitable system that permits users to provide data to, and access, process, and utilize data stored in a data storage element (e.g., a database) that can be accessed remotely over a network. Further example environments in which an embodiment of the invention may be implemented include devices (including mobile devices), software applications, systems, apparatuses, networks, or other configurable components that may be used by multiple users for data entry, data processing, application execution, data review, etc. and which have user interfaces or user interface components that can be configured to present an interface to a user. Although further examples below may reference the example computing environment depicted in FIGS. 1-3, it will be apparent to one of skill in the art that the examples may be adapted for alternate computing devices, systems, apparatuses, processes, and environments. Note that an embodiment of the inventive methods may be implemented in the form of an application, a sub-routine that is part of a larger application, a "plug-in", an extension to the functionality of a data processing system or platform, or any other suitable form.

Figure 4A:
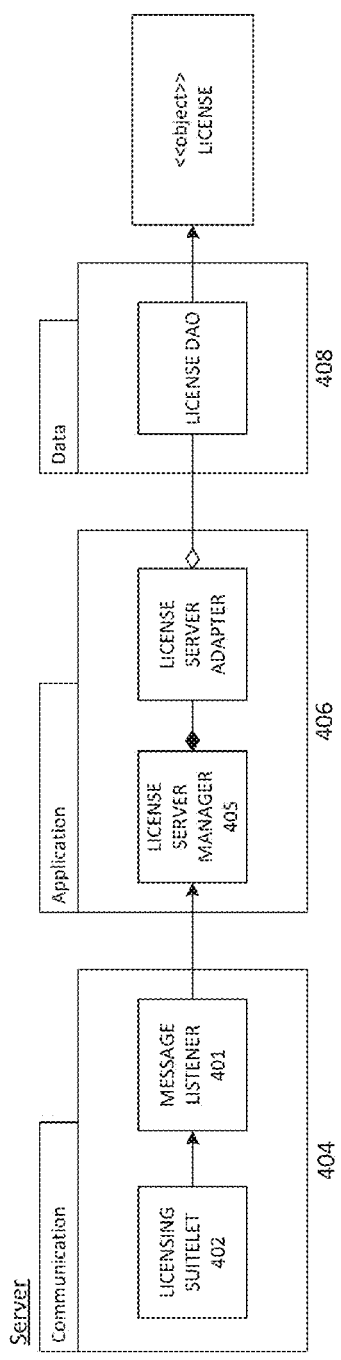
FIGS. 4(a) and 4(b) are flow charts or flow diagrams illustrating a process, method, operation, or function for managing the rights associated with a license to an application or an extension to an application that may be used when implementing an embodiment of the invention.
Figure 4B:
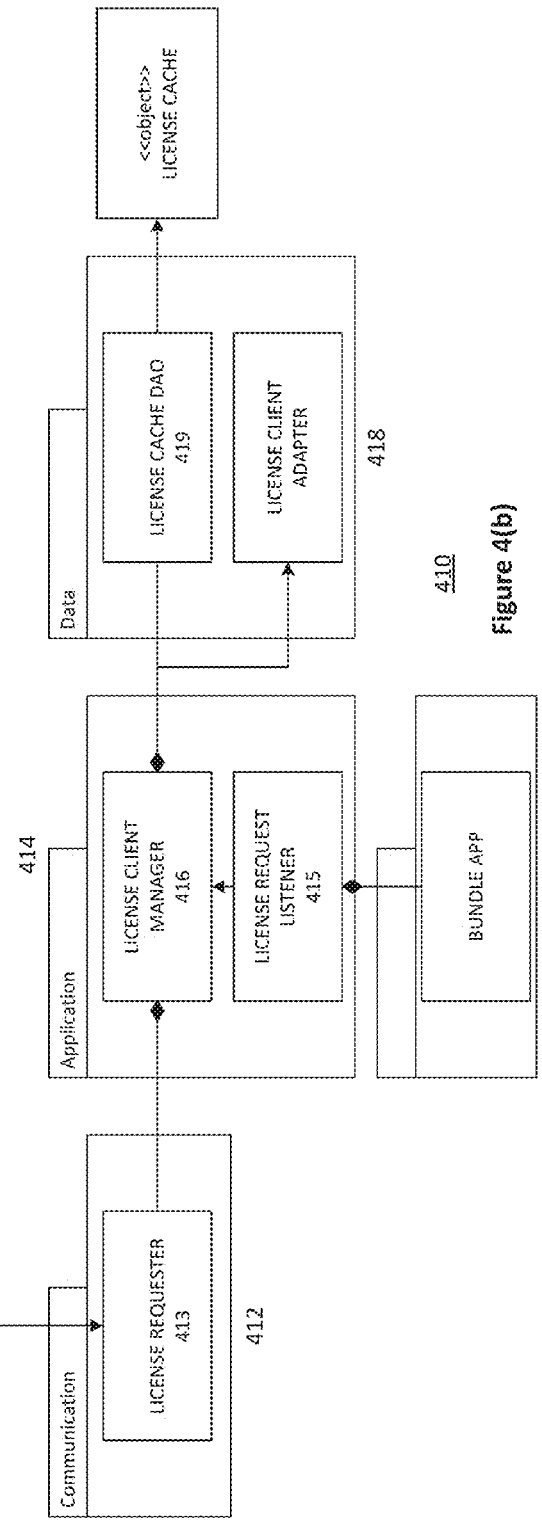
Figure 5A:
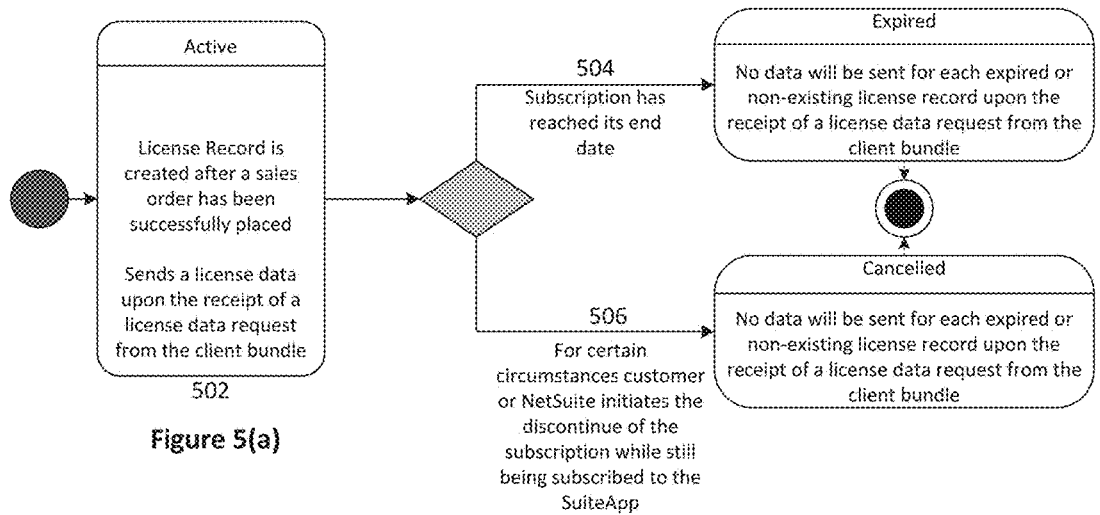
FIGS. 5(a), 5(b), and 5(c) are additional flow charts or flow diagrams illustrating a process, method, operation, or function for managing the rights associated with as license to an application or an extension to an application that may be used when implementing an embodiment of the invention.
Figure 5B:
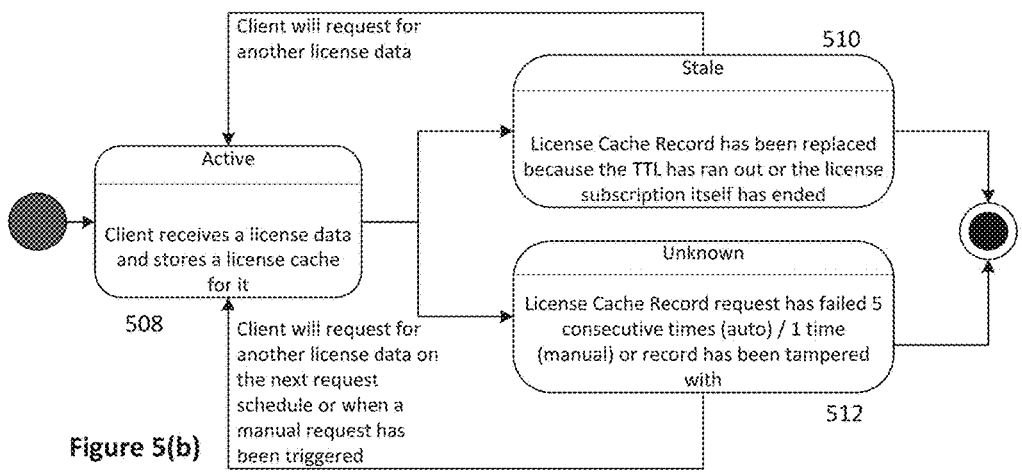
Figure 5C:
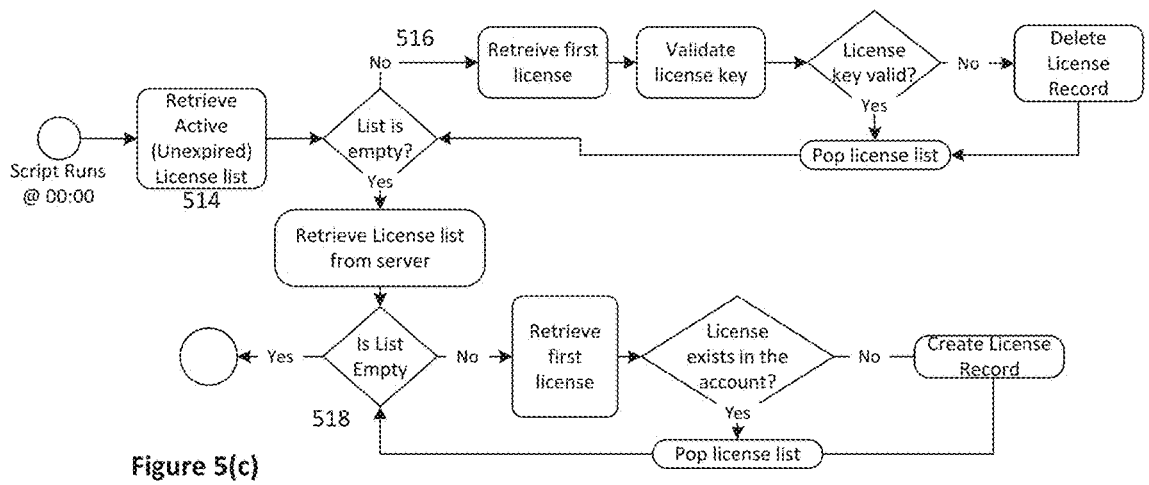

FIGS. 4(a) and 4(b) are flow charts or flow diagrams illustrating a process, method, operation, or function for managing the rights associated with a license to an application or an extension to an application that may be used when implementing an embodiment of the invention. FIGS. 5(a), 5(b), and 5(c) are additional flow charts or flow diagrams illustrating a process, method, operation, or function for managing the rights associated with as license to an application or an extension to an application that may be used when implementing an embodiment of the invention.

FIG. 4(a) illustrates the architecture of a License Server Application 400, which is composed of three functional layers or elements: communication 404, application 406 and data 408. The communication layer 402 "listens" (as suggested by the element "message listener 401"), acknowledges, and responds to the License Client Application 410, illustrated in FIG. 4(b). The application layer 406 interfaces between the communication 404 and data 408 layers by processing the incoming messages, retrieving the required information, and providing the response content. The data layer 408 holds the information needed by the application layer 406 for providing license responses.

FIG. 4(b) describes the architecture of the License Client Application 410, which is also composed of a communication layer 412, an application layer 414, and a data layer 418. The communication layer 412 handles messaging functions to and from the License Server Application 400. The application layer 414 processes requests coming from other applications and translates the License Server Application responses into cached license data 419 regarding the tenant. The data layer 418 stores license information locally with the tenant account, making it quickly available to applications running locally, while reducing network traffic and server overload.

FIG. 5(a) illustrates the license life cycle on the server side. Licenses are activated after creation, but can expire after a certain period of time or be cancelled due to one of several reasons, such as a bad debt. A license is automatically generated with an "active" status (502), once the access rights to a specific application extension are acquired. The license will have a type that describes its purpose, as well as a validity period. Once the validity period is completed, the license will move to an "expired" status (504). At any point in time the application extension license can be set to "cancelled" (506), either by decision of the provider or by decision of the customer. Typically; only "active" licenses are consumed/processed by the licensing management system, while the others are kept for audit purposes.

FIG. 5(b) illustrates the lifecycle of the license cache on the client side. The license cache is set to active once retrieved from the server, but it can become "stale" in case the TTL (Time-to-Live) expires or becomes set to "unknown" if communication to the Licenser Server App fails. Only "active" licenses (508) are returned from the server to the client; therefore, all licenses on the client are created with an "active" status, which provides the tenant or user with access to the application extension. A cached license will go into "stale" status (510) if the caching validity period (TTL) has finished and a new server call has not yet occurred. This status will not provide tenants and users access to the application extension. A cached license can go into an "unknown" status (512) if the server is not available for a sufficiently long period, and the client reaches the maximum number of server retries.

FIG. 5(c) illustrates the license availability logic on the License Client Application (element 410 of FIG. 4(b)). Once a license availability request is received, the License Client App accesses the license cache to verify if there is a cache of available licenses stored locally. In the situation where there is no cache or the cache has expired, the License Client App will trigger a request to the License Server App for new license information. When the local license information is available, the License Client App will look for a valid license record for the requesting application (514), responding positively in case one is found, or negatively otherwise. Once a license availability request is received, the License Client App will scan the cached licenses in their order of creation. Licenses set to a "stale" status are removed from the cache. If the License Client finds a valid license key that matches the request, it will return the license information (corresponding to branch 516). If the cache is empty, or if no matching licenses are found, then the License Client will communicate with the License Server, retrieving all "active" licenses for that specific tenant (corresponding to branch 518). The response is cached, and the License Client performs the same scan of the cached licenses looking for a match. If no matching licenses are found, then the License Client will inform the requesting application accordingly.

As described, the Inventive License Management System consists of 2 primary applications (Apps), a License Server App 400 and a License Client App 410. The primary functions and capabilities of these elements are described in greater detail in the following sections.

License Server Application (App)

The License Server App 400 manages Licenses for all customer accounts. In some cases, a license may be created based on the line items included in a Sales Order or other transaction record. For example, license terms or the data relevant to determining the terms of a license may be based on one or more of (a) the specific extension or application being purchased or used, (b) the duration of a service or customer support agreement, (c) the cost of a purchase or service agreement (thereby indicating a level of service or features), (d) the presence of a specific value-add feature or service, (e) the identification of a specific quality-of-service guarantee, (f) the ability to have priority with regards to use of certain resources when accessing an extension, (g) the type of data that an extension may be used to process, (h) the number of users from a single tenant that can have access to a feature or function, (i) the number of times an action can be performed under the terms of the license, etc. Note that some or all of these features of a transaction may be reflected in line items or comments associated with a sales order or memorandum related to a transaction.

The License Server App 400 operates to search through the Licenses recorded and identify any relevant Licenses based on one or more criteria, including but not requiring or limited to Customer Account Number, Feature and Date. This search across Licenses is managed by the License Server Manager element or process 405, which is part of the License Server App. The License Server Manager 405 operates to search for relevant licenses as well as extract useful information from any that are found, to infer the validity (or lack thereof), as well as (in some cases) the value of a License.

Another component of the License Server App 400 is the Licensing Module 402. This element or process manages communications with the License Client App 410 in a secure manner. Communications between the License Server App 400 and the License Client App 410 are typically encrypted and secure. The License Client App 410 connects/communicates with the Licensing Module 402 and can request relevant License data for a specific client. In addition to returning all active and/or expired licenses for the customer, the Licensing Module 402 (or another functional element or module of License Server 400) may also return license related meta-information, such as a license's TTL (time-to-live), by virtue of which it can control the behavior of the License Client App.

Note that in a typical embodiment, there is only one instance of the License Server App; all License Client Apps connect to the same License Server App.

License Client Application (App)

Unlike the single License Server App 400, an instance of the License Client App 410 is installed in each of the Customer Accounts (i.e., for each tenant utilizing the multi-tenant platform):

Other Applications or extensions installed in the Customer Account invoke the License Client App 410 to access information regarding a License's validity or terms. Such requests by other Applications/extensions in the Customer Account are managed by a License Request Listener 415, which is a part of the License Client App. Based on the validity and/or value of the License or license term(s) returned by the License Client App, the extension or Application can grant or deny access to particular aspects or functionality of the extension or Application;

Another part of the License Client App 410 is the License Requester 413. The License Requester 413 manages communications with the License Server App (or more specifically, the Licensing Module 402). All communications between the License Requester 413 (part of the License Client App) and the Licensing Module 402 (part of the License Server App) are typically encrypted and secure. The License Requester 413 is designed to deal with scenarios such as the Licensing Module 402 not being reachable and other expected exception scenarios;

Another component of the License Client App 410 is the License Client Manager 416. In order to improve performance and reduce network trips to the License Server App 400, the License Client Manager 416 may maintain a cache of currently active Licenses in License Cache 419. License Client Manager 416 is responsible for evaluating the validity of Cache 419 and refreshing the cache when it is out of date or otherwise not sufficiently reliable. In order to achieve this, it works closely with the License Requester 413 and the License Request Listener 415 functions or processes.

The inventive Application/Extension License Management System is designed to reduce the wait times/delays when checking aspects of licenses, reduce network round-trips and traffic, reduce callbacks to the License Server and decrease the overhead for License Checks. Further advantages and benefits of one or more embodiments of the inventive system and methods include, but are not limited to:

Embodiments are designed to make managing licenses for thousands of customers using a variety of extensions or Applications easier and more readily scalable. Conventionally, access is granted or redacted manually, and required updating the code on a Client Account. In contrast, the inventive License Management System reduces manual intervention and thus can more easily scale to thousands of accounts; and Embodiments of the inventive system and methods enable a platform administrator and its Partners to offer its extensions or Applications using many of the desired licensing frameworks, including:

Trial licenses with a fixed (e.g., 30 days) validity;

Freemium Licenses (some functionality in the application or extension is free, while some requires a paid license);

Paid Apps (a user or account requires a valid license to use the App); and

Subscription or Value/Usage based licensing.

On request from the License Client App 410, the License Server App 400 sends back an encrypted JSON (JavaScript Object Notation) containing License information for the requesting customer/user/account, as well as configuration/control data that can influence the behavior of the License Client App. This is done with the intention of altering or influencing the behavior of the License Client App without having to update the License Client App across an entire set of accounts. Note that although the basic structure of the following JSON is well defined, the structure described is designed to be extensible to support newer License Types and/or enforcement practices.

In some embodiments, a typical JSON may have the following structure:

```
License Data:{
  "accountId":"123456",
  "licenses":[
    {
      "License Type":"DUNNINGLETTERS",
      "startDate":1453104000000,
      "endDate":1453449600000,
      "hval":"3cbbd4f86be740f56ff274770e153f28d30cbf01721f768d25f3767d5a9e9684"
    },
    {
      "License Type":"CAMPAIGNEMAILS",
      "endDate":1333104000000,
"payload/parameters" : { "Term" : "Weekly", "Quantity" : 2000},
      "hval":"8760f224c3b9acfe95507d04c2ca33ba37980e264987cc8ba0c4918451c9ce91"
    },
    {
      "License Type":"ELECTRONICINVOICING",
      "endDate":1478104000000,
"payload/parameters" : { "Term" : "Monthly", "Quantity" : 10000},
      "hval":"6y5sb22y39049acfe95507d04c2ca33ba37980e264987cc8ba0c4918451c96su"
    },
    {
      "License Type":"TAXAUDITFILE",
      "payload/parameters": { "Countries" : ["MX", "PT", "US","CN"]},
      "hval":"56ge322y39049acfe95507d04c2ca33ba37980e264987cc8ba0c4918451h6t79"
    }
  ],
  "TTL":"3",
  "RefreshOnLogin":true
}
``` where the terms or parameters of the above example have the following interpretation and meanings:

accountId: Customer/User/Account Identifier;
licenses: Array of licenses for the said customer;
License Type: Functionality, feature or Extension or App being Licensed or controlled;
Start and End Date: Date of Validity of the Licenses; and
hval: encrypted signature to detect tampering with the JSON sent by License Server App.

Note that the following "keys" contained in the payload/parameters of the License record are extensible:

Term: Frequency or term of the License;
Quantity: In case of a quantity based license, the value or quantity allowed; and
Countries: List of countries for which the license is applicable.

The following represent Meta/Configuration/Control Keys (note that this list is also extensible to permit configuration of other features or parameters):

TTL: Time to Live—tells License Client App how soon to check back for new/additional licenses; and
RefreshOnLogin: tells License Client App to query License Client App and refresh the License Cache for every user Login.

Note that in some embodiments, each license type may be associated with its own distinct access control data (or "key"). Thus, the pairs of keys and values change according to the license type, permitting control over which accounts or users are authorized to utilize various functions or capabilities of an application or extension.

A more generalized structure of the JSON might have the following structure (note that ellipses are not part of the regular JSON but are used here to represent that more of such structures (name-value or full licenses) could be added):

```
License Data:{
  "accountId":"VALUE_MANDATORY",
```

-continued

```
  "licenses":[
    {
      "License Type":"VALUE_MANDATORY",
      "startDate":VALUE_OPTIONAL,
      "endDate":VALUE_OPTIONAL,
      "payload/parameters" : { "name" : "value", "name" : value, ... },
      "hval":"value_mandatory"
    },
    ...
  ],
  "TTL":"3",
  "RefreshOnLogin":true
  ...
}
```

Note that additional properties or characteristics of a license may be added to the JSON or other form of license/rights definition as needed to enable allocation of certain rights or functionality as might be desired to users or accounts (as suggested by the level of extensibility after "RefreshOnLogin":true).

Figure 6:
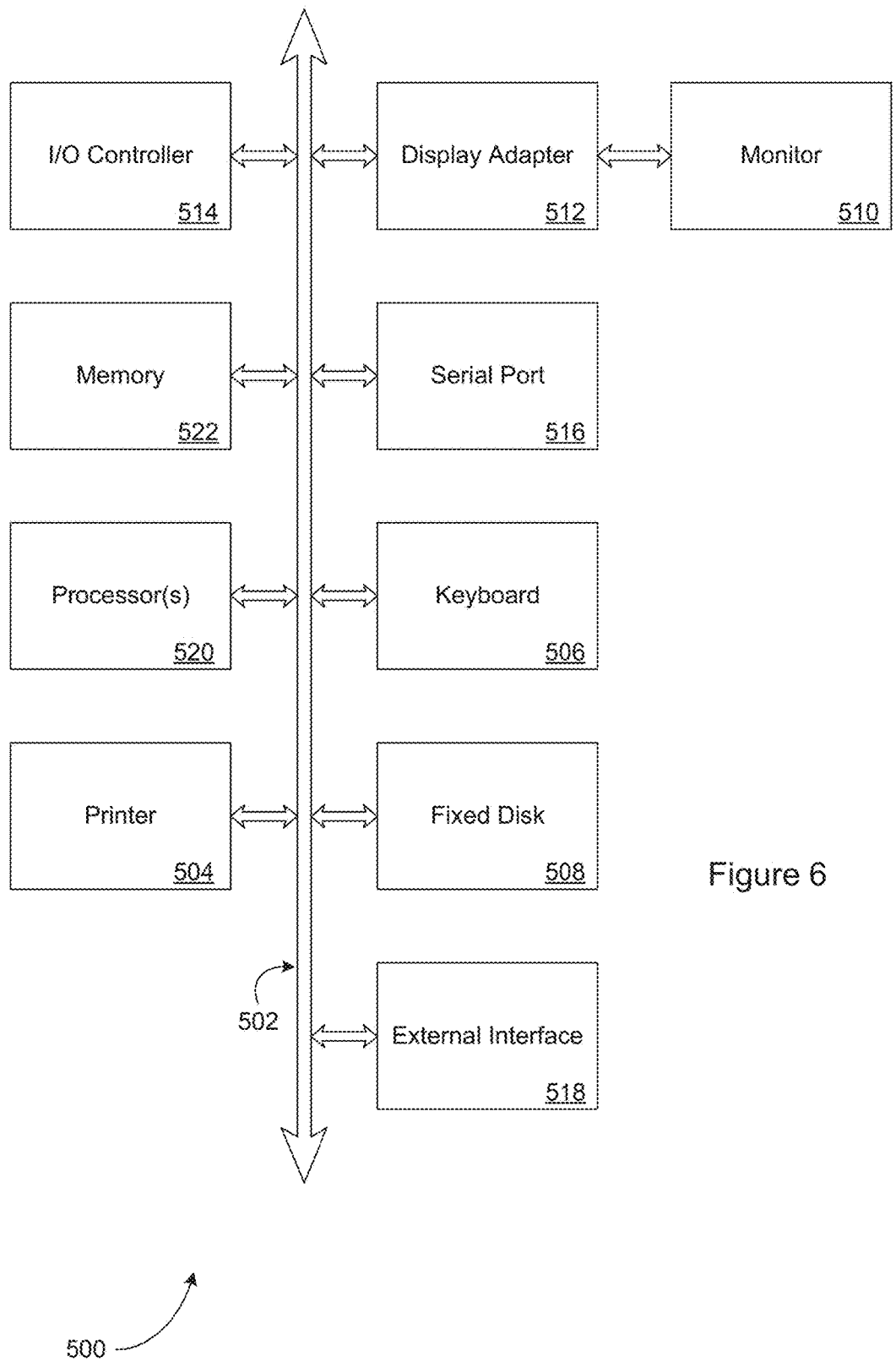
FIG. 6 is a diagram illustrating elements or components that may be present in a computer device or system configured to implement a method, process, function, or operation in accordance with an embodiment of the invention.

In accordance with one embodiment of the invention, the system, apparatus, methods, processes, functions, and/or operations for efficiently managing access to and usage of an extension or application installed on a multi-tenant platform may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 6 is a diagram illustrating elements or components that may be present in a computer device or system 500 configured to implement a method, process, function, or operation in accordance with an embodiment of the invention. The subsystems shown in FIG. 5 are interconnected via a system bus 502. Additional subsystems include a printer 504, a keyboard 506, a fixed disk 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 5 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, Javascript, C++ or Perl using, for example, conventional or object-oriented techniques. The software code may be stored as a series of instructions, or commands on a computer readable medium, such as a random-access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A system for managing the usage of an application or an extension to an application, the system comprising:
   one or more applications installed on a data processing platform;
   one or more extensions to at least one of the one or more applications, each of the one or more extensions installed on the data processing platform and each extension associated with a corresponding set of license terms governing the use of the extension;
   a plurality of tenant accounts, wherein each tenant account is configured to have access to an instantiation of at least one of the one or more applications installed on the data processing platform;
   at least one processor configured to execute instructions from a memory;
   a non-transitory computer-readable medium including a stored set of computer-executable instructions that when executed by the at least one processor cause the system to:
      receive an access request from a user of a first tenant account of the plurality of tenant accounts to access an application or an extension to an application;
      access a license cache that is maintained for the first tenant account and verify whether active licenses are stored locally in the license cache;
      when the license cache does not contain the active licenses, (i) trigger a request for licenses to a server process installed on the data processing platform, (ii) retrieve active licenses associated with the first tenant account, and (iii) store the retrieved active licenses in the license cache maintained for the first tenant account;
      when the active licenses are stored in the license cache, scan the active licenses to find an active license record associated with the application or the extension corresponding to the access request;
      when the active license record is found in the license cache with respect to the application or with respect to the extension, then access data from the active license record that provides information regarding terms or conditions of the first tenant account with respect to the application or to the extension;
      based on the accessed data, determine the terms or conditions of the active license for the first tenant account with respect to the application or to the extension;
      based on the determined terms or conditions, configure the application or the extension for the first tenant account to grant or deny access to selected functionality; and
      make the configured application or extension available for use by the user of the first tenant account.

2. The system of claim 1, further comprising computer-executable instructions, which when executed, cause the system to determine any applications or extensions for which the first tenant account of the plurality of tenant accounts has a license or has had a license, wherein this determination is performed at least in part by an exchange of messages between a client process installed in the account and the server process installed on the data processing platform.

3. The system of claim 2, wherein the exchange of messages occurs over a secure communications channel, and further, wherein the channel is not accessible by a user of a different tenant account.

4. The system of claim 1, further comprising providing an encrypted JSON (JavaScript Object Notation) containing license information for the first tenant account in response to determining if the first tenant account has a license to the application or extension.

5. The system of claim 1, wherein configuring the application or extension for the one of the plurality of tenant accounts is performed at least in part by an exchange of messages between a client process installed in the account and a server process installed on the data processing platform.

6. The system of claim 1, wherein the terms or conditions of the active license record for the first tenant account of the plurality of tenant accounts depends on one or more of (a) the extension or the application being purchased or used, (b) a duration of a service or customer support agreement, (c) a cost of a purchase or service agreement, (d) a presence of a specific value-add feature or service, (e) an identification of a specific quality-of-service guarantee, (f) an ability to have priority with regards to use of certain resources when accessing an extension, (g) a type of data that an extension may be used to process, (h) a number of users from a single account that can have access to a feature or function, or (i) a number of times an action can be performed under the terms of the license.

7. The system of claim 1, wherein the one or more applications installed on the data processing platform include an Enterprise Resource Planning application, a Customer Relationship Management application, and a financial application.

8. The system of claim 1, wherein configuring the application or extension for use by the first tenant account of the plurality of tenant accounts includes one or more of setting a use period, permitting a functionality of the application or extension, or preventing a functionality of the application or extension.

9. The system of claim 1, wherein configuring the application or extension for use by the first tenant account of the plurality of tenant accounts includes configuring the application or extension based at least in part on business-related data associated with the first tenant account.

10. The system of claim 9, wherein the business-related data associated with the first tenant account includes one or more of a number of transactions, a type of transaction, or a value of a set of transactions.

11. The system of claim 1, further comprising computer-executable instructions, which when executed, cause the system to determine if a license for the application or the extension is one of the licenses for which the first tenant account has had a license, when the license cache does not contain an active license for the first tenant account with respect to the application or with respect to the extension.

12. The system of claim 1, further comprising generating a user interface to provide the user with information regarding the applications or extensions for which the first tenant account of the plurality of tenant accounts has a license.

13. The system of claim 12, wherein for each license the first tenant account of the plurality of tenant accounts has, the user interface includes information regarding one or more of a type of license, the terms of the license, or a value of the license.

14. The system of claim 1, further comprising computer-executable instructions, which when executed, cause the system to enable the user of the first tenant account to register a purchase of a license to the application or extension.

15. A data processing platform, comprising:
at least one processor configured to execute instructions from a memory;
at least one non-transitory computer-readable medium;
an application installed on the data processing platform in the at least one non-transitory computer-readable medium;
an extension to the application, the extension installed on the data processing platform and associated with a set of license terms governing usage of the extension;
a plurality of tenant accounts, wherein each tenant account is configured to have access to an instantiation of the application installed on the data processing platform;
the at least one non-transitory computer-readable medium further including a stored set of computer-executable instructions that when executed by the at least one processor cause the system to:
receive an access request from a user of a first tenant account of the plurality of tenant accounts to access the extension to the application;
in response to the access request, access a license cache that is maintained for the first tenant account and verify whether active licenses are stored locally in the license cache;
when the license cache does not contain the active licenses, (i) trigger a request for licenses to a server process installed on the data processing platform, (ii) retrieve active licenses associated with the first tenant account, and (iii) store the retrieved active licenses in the license cache maintained for the first tenant account;
when the active licenses are stored in the license cache, scan the active licenses to find an active license record associated with the application or the extension corresponding to the access request;
when the active license record is found in the license cache with respect to the extension, then access data from the active license record that provides information regarding terms or conditions of the first tenant account with respect to the extension;
based on the accessed data, determine the terms or conditions of the active license for the first tenant account with respect to the extension;
based on the determined terms or conditions, configure the extension for the first tenant account to grant or deny access to selected functionality; and
make the configured extension available for use by the user of the first tenant account of the plurality of tenant accounts.

16. The data processing platform of claim 15, further comprising computer-executable instructions, which when executed, cause the platform to determine any applications or extensions for which the first tenant account of the plurality of tenant accounts has a license or has had a license, wherein this determination is performed at least in part by an exchange of messages between a client process installed in the account and the server process installed on the data processing platform.

17. The data processing platform of claim 16, wherein the exchange of messages occurs over a secure communications channel, and further, wherein the channel is not accessible by a user of a different tenant account.

18. The data processing platform of claim 15, wherein the terms or conditions of the active license record for the first tenant account of the plurality of tenant accounts depends on one or more of (a) the extension or the application being purchased or used, (b) a duration of a service or customer support agreement, (c) a cost of a purchase or service agreement, (d) a presence of a specific value-add feature or service, (e) an identification of a specific quality-of-service guarantee, (f) an ability to have priority with regards to use of certain resources when accessing an extension, (g) a type of data that an extension may be used to process, (h) a number of users from a single account that can have access to a feature or function, or (i) a number of times an action can be performed under the terms of the license.

19. The data processing platform of claim 15, wherein the application installed on the data processing platform is one or more of an Enterprise Resource Planning application, a Customer Relationship Management application, a human resources management application, and a financial application.

20. The data processing platform of claim 15, wherein configuring the extension for the first tenant account of the plurality of tenant accounts includes one or more of setting a use period, permitting a functionality of the extension, or preventing a functionality of the extension.

* * * * *